(12) United States Patent
Powell et al.

(10) Patent No.: US 8,571,912 B2
(45) Date of Patent: *Oct. 29, 2013

(54) METHOD AND SYSTEM FOR ALLOCATING SPECIFIC APPOINTMENT TIME WINDOWS IN A SERVICE INDUSTRY

(75) Inventors: G. Edward Powell, Austin, TX (US); Mark T. Lane, Franklin, TN (US); Runar Indseth, Austin, TX (US)

(73) Assignee: Pointserve, Inc., Austin, TX (US)

( * ) Notice: Subject to any disclaimer, the term of this patent is extended or adjusted under 35 U.S.C. 154(b) by 847 days.

This patent is subject to a terminal disclaimer.

(21) Appl. No.: 11/584,650

(22) Filed: Oct. 23, 2006

(65) Prior Publication Data
US 2007/0038498 A1 Feb. 15, 2007

Related U.S. Application Data

(63) Continuation of application No. 09/327,228, filed on Jun. 7, 1999, now Pat. No. 7,127,412.

(51) Int. Cl.
*G06Q 10/00* (2012.01)

(52) U.S. Cl.
USPC .......................... 705/7.13; 705/7.14; 705/7.16

(58) Field of Classification Search
USPC .................................. 705/1, 5–9, 7.12–7.16
See application file for complete search history.

(56) References Cited

U.S. PATENT DOCUMENTS

| | | | | |
|---|---|---|---|---|
| 5,467,268 A * | 11/1995 | Sisley et al. | .................. | 705/9 |
| 5,615,121 A * | 3/1997 | Babayev et al. | .................. | 705/9 |
| 5,875,436 A * | 2/1999 | Kikinis | .................. | 705/34 |
| 5,913,201 A | 6/1999 | Kocur | | |
| 5,918,207 A * | 6/1999 | McGovern et al. | .................. | 705/1 |
| 5,920,846 A * | 7/1999 | Storch et al. | .................. | 705/7 |
| 5,982,863 A * | 11/1999 | Smiley et al. | .................. | 379/88.18 |
| 6,058,370 A * | 5/2000 | Church et al. | .................. | 705/7.34 |
| 6,061,691 A * | 5/2000 | Fox | .................. | 707/104.1 |
| 6,574,605 B1 * | 6/2003 | Sanders et al. | .................. | 705/7.26 |
| 6,578,005 B1 * | 6/2003 | Lesaint et al. | .................. | 705/7.14 |

(Continued)

FOREIGN PATENT DOCUMENTS

JP 07182425 5/1994

OTHER PUBLICATIONS

Paz, et al., Maintenance Scheduling: Issues, Results, and Research Needs, Int'l. J. Operations & Production Mgmt., vol. 14 No. 8, 1994, pp. 47-69 (Dialog copy).*

(Continued)

*Primary Examiner* — Daniel Vetter
(74) *Attorney, Agent, or Firm* — Andrews Kurth LLP; Sean Wooden (57) ABSTRACT

The present invention provides a method for allocating appointment time windows. The steps of this method include creating a statistical estimate of a daily schedule comprising a series of estimated service orders. An actual service order is then received. This actual service order is inserted into the daily schedule by using a set of scheduling instructions for determining the least cost to employ the available service resources. At this point, this actual service order does not have a system imposed time window. The set of scheduling instructions is used to determine a time window surrounding this insertion point. If the customer accepts this time window, then the closest estimated service order is replaced by this actual service order, and the daily schedule is recomputed based upon the revised set of service orders to yield a revised daily schedule. This process may be repeated for any number of days or time periods from which the customer may choose the time window best meeting the customer's availability.

15 Claims, 2 Drawing Sheets

(56) References Cited

U.S. PATENT DOCUMENTS

| | | | |
|---|---|---|---|
| 7,069,228 B1 * | 6/2006 | Rose et al. | 705/5 |
| 2001/0037229 A1 * | 11/2001 | Jacobs et al. | 705/8 |
| 2002/0065700 A1 * | 5/2002 | Powell et al. | 705/9 |

OTHER PUBLICATIONS

Collins, et al., Automated Assignment and Scheduling of Service Personnel, IEEE Expert: Intelligent Systems and Their Applications, vol. 9, No. 2, Apr. 1994, pp. 33-39.*

Motwani, et al., Optimizing Job Scheduling in the Service Sector, J. of Prof. Services Marketing, vol. 11, No. 1, 1995, pp. 21-32.*

Paz et al, "Maintenance Scheduling: Issues, results & research needs", 1994 International Journal of Operations & Production Management, V14 No. 8, pp. 47-69; DialogWeb copy pp. 1-18.

Begur et al, "An integrated Spatial DDSS for Scheduling and Routing Hope-Health-Care Nurses", Jul. 1997, Interfaces, V 27 No. 4, pp. 35-48.

* cited by examiner

METHOD AND SYSTEM FOR ALLOCATING SPECIFIC APPOINTMENT TIME WINDOWS IN A SERVICE INDUSTRY

CROSS REFERENCE TO RELATED APPLICATION(S)

This is a Continuation of application Ser. No. 09/327,228 filed on Jun. 7, 1999 now U.S. Pat. No. 7,127,412, which is hereby incorporated by reference in its entirety.

TECHNICAL FIELD OF THE INVENTION

The present invention relates generally to task management. More particularly, the present invention relates to a system and method for efficiently allocating and scheduling service technicians and resources to complete work assignments within a specified time window. Even more particularly, by effectively combining the statistical pre-placement of points for service with the use of a robust scheduling engine for optimally assigning service dates and time window for service calls, the present invention provides an improved system and method for allocating service resources in a broad array of service call applications.

BACKGROUND OF THE INVENTION

The combination of scheduling service appointments and scheduled maintenance presents a problem to any service company. Customers prefer prompt and professional service without undue waiting. This is particularly true of a utility company, such as one providing electricity, gas, telephone, or cable, and the like, which provides on-site service. Everyone wants service, but no one wants to wait for service technicians. Waiting directly impacts the perceived customer service. Utilities must quickly and efficiently respond to ever changing service requests by their customers. Additionally when the service provider schedules a customer request, the provider must determine the time when the service technician will be on-site and provide this information to the customers. Customers' personal schedules are often directly impacted by this time commitment. Additionally, some business customers may alter their business operations based on when the service technician is scheduled to be on site. In such an environment, customer service is directly impacted by the provider's ability to accurately schedule and communicate the time window allocated to the service request.

The service provider, based on experience, must plan the sequence in which the work will be done, and the extent to which resources (workforce members) will be devoted to any particular task. Unforeseen circumstances, such as emergent customer requests and absent employees, may effect this plan with again unforeseen consequences. Such circumstances must be considered by an experienced provider.

One solution involves assigning bands of concentric circles around a central depot that define time windows. A service provider may consider bands of 8-10 AM, 9-11 AM, 10-12 PM and so on. If a customer calls in and their location is calculated to be in one of the bands, then that time window is applied to the customer request. This approach is based on the following assumptions: (1) providers leave from, and return to, a central depot, and (2) service technicians are assumed to all be capable of the same skills. This approach is a simplified heuristic with regard to the general scheduling problem. There may be key aspects of the scheduling problem (such as skills and other constraints) that can be overlooked. There are difficulties in arbitrarily choosing the time window bands and their geographic boundaries.

Similarly, scheduling in the manufacturing or factory setting is of great importance. Customer orders for various items need to be processed in a certain amount of time (i.e., by a shipment date). For each item ordered which is not already in inventory, the item must be manufactured. To manufacture the item, certain resources (materials, machine time, man hours, etc.) used in a predetermined sequence of events are required. In order to efficiently utilize the resources of the manufacturing plant in such manufacturing of items, and ultimately in fulfilling a multiplicity of orders, the manufacturer generally employs a device for scheduling the use of different resources at different dates and times.

Scheduling software is widely used in manufacturing industries to address this problem. The advent of advanced technology in manufacturing systems has highlighted our inability to effectively schedule the production processes. In any production unit, the planner is responsible for making scheduling decisions. Simple scheduling decision rules can effect the system performance to a large extent. Hence, selecting proper scheduling rules is very difficult and such scheduling decisions must often be made in mere seconds.

One of the best approaches to solve these manufacturing scheduling problems has been to use software solutions. Significant manufacturing throughput improvements can be made by using a simulation model to determine a future course for a manufacturing system. Hence, at each scheduling decision point, the scheduling software can be used and a deterministic simulation is run to calculate how control policy impacts the current system.

Scheduling software helps to generate potential scheduling alternatives based on real-time shop information and scheduling knowledge. However, unlike the manufacturing process problem, the order of the service requests to be filled is constantly changing. A manufacturing process itself is fixed and unchanging, while service providers must respond to changing and emergent customer requests.

SUMMARY OF THE INVENTION

Therefore, there is a need for a method and system to provide advanced planning and scheduling solutions enabling a user or planner to optimize the allocation of his workforce in response to changing service requests and priorities present in a service industry while meeting prior customer commitments.

There is a need for a software solution enabling a service provider to provide improved customer service and satisfaction, and improved workforce efficiency.

Moreover, there is a need for a software solution allowing a service provider to increase their customer-responsiveness, foster a reliable and timely service request commitment process, and allow for better and more accessible information.

Yet another need exists for a software solution that allows a planner to accommodate the multiple skill levels of individuals within a workforce and assign service requests according to the type of work and coverage requirements. Often an intricate relationship exists between task definition, job requirements, shift scheduling and employees personal schedules and other preferences, further complicating the planning of work schedules.

Yet another need exists for a software solution which allows a planner to quickly and efficiently create schedules that meet customer requirements while providing adequate service coverage.

In particular, a need exists for a method and system that provides for efficiently scheduling service technicians and resources to complete service requests within a customer determined and provider estimated time window.

Yet another need exists for a software solution which allows a planner to quickly and efficiently create schedules that meet customer requirements and employee preferences while still providing coverage, thereby reducing absenteeism, improving workforce morale, and allowing overtime expenses to be reduced.

In accordance with the present invention a method and system are provided for allocating specific appointment time windows in a service industry. More specifically, the present invention provides a method for efficiently and reliably allocating appointment time windows through the combination of a statistically derived pre-planning of a most likely service route with the operation of a robust scheduling engine for establishing agreed-upon windows for service call allocation.

The steps of this method include creating a statistical estimate of a daily schedule comprising a series of estimated service orders. When an actual service order is received, this actual service order is inserted into the daily schedule by utilizing a scheduling engine to determine the least cost to employ the resources available. At this point, the actual service order does not have a system imposed time window. The scheduling software is used to determine a time window surrounding this insertion point. If the customer accepts this window, then the closest estimated service order is replaced by this actual service order, and the daily schedule is recomputed based upon the revised series of service orders.

The method of this invention further includes repeatedly processing subsequent and emergent service requests which may impact work force scheduling. The invention processes any number of additional and emergent service requests to create and distribute modified schedules to members of the workforce at any given point in time, while observing previous time commitments made to each customer.

A technical advantage provided by the method of the present invention is advanced planning and scheduling solutions, enabling a service provider to optimize the allocation of his workforce in response to the changing service requests and priorities present in the service industry, while communicating a time window within which the service will be performed to the customer.

Another technical advantage of the present invention is the capability to provide improved customer service and satisfaction, and improved workforce efficiency. This is accomplished by allowing the planner to effectively communicate revised customer needs to the workforce, and in turn the expected workforce response to the customer. The present invention allows service providers to increase their customer-responsiveness, fostering a reliable and timely service request commitment process, and allowing for better and more accessible information.

A further technical advantage of the present invention is the capability of providing a scheduling solution which allows a planner to accommodate the multiple skill levels of individuals within a workforce and assign service requests according to the required skill level requirements. Often an intricate relationship exists between task definition, job requirements, shift scheduling, and employees' personal schedules and other preferences. These intricate relationships have previously complicated the efficient planning of work schedules encompassing diverse workforces and assignments.

A still further technical advantage of the present invention is the ability of service providers to quickly and efficiently create schedules that meet both customer requirements, industry requirements, and employee preferences while still providing coverage. Furthermore, the present invention reduces the man hours spent trying to create workable schedules by using the computational power of a computer. A service provider can quickly generate a schedule in real time with narrow time windows at which a service technician may be on site at a customer's residence or facility. This schedule in turn is provided in real time to a customer.

Finally, the present invention allows any adverse impact of unexpected or emergent work assignments to be quickly identified. These adverse effects once identified can be used to construct a new daily schedule to eliminate the adverse effects if possible through a reallocation of the workforce or to inform the customer if the appointment cannot be kept.

Yet another technical advantage of the present invention allows the service provider to efficiently and effectively schedule the performance of required preventive maintenance while making and keeping specific time commitments made to customers. This is accomplished by examining and reexamining the requirements of diverse assignments and properly and efficiently scheduling available manpower within the workforce.

Still another technical advantage of the present invention allows the service provider to determine personnel requirements. This is accomplished by examining both past service requests to create a statistically accurate model of the expected service request allocations and expected future needs enabling the user to achieve a fair distribution or cost effective distribution of personnel.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of various drawings.

The present invention provides a method and system for allocating specific appointment time windows in a service industry.

The present invention addresses an improvement in the ability of any service company to provide customers specific appointment time windows, within which a service technician (or delivery person) will arrive at the customer's residence or facility on the specified day. Typically a customer will contact the service provider via a call center, service center or similar facility with a service request. The customer may request a specific time or merely request that the service provider inform the customer of the specific time or time window at which the service technician will provide their services. Customer service can be greatly improved if the specified time window can be made as narrow and accurate as possible. No service provider can provide an exact estimate, but narrowing the window of time surrounding the technician's arrival and insuring that the service provider is able to meet a promised window are important objectives toward improving customer service.

Promising a time window that the service provider cannot meet does not benefit either the service provider or the customer. Therefore, most service providers allocate wide time windows that are applied at random or based on customer input. Service providers commonly make broad commitments such as service in the morning or afternoon at the customer's preference. The service provider can track how many service requests are scheduled for the morning or afternoon. In a broad sense, the service provider tracks its commitments with regard to their capacity. However, in such a broad scheme, the service provider sacrifices service requests that otherwise may have been serviced in favor of satisfying customers by keeping the promised appointments.

A typical service provider does not regard scheduling constraints and optimal routing when time windows are promised to customers. Scheduling constraints can come in a variety of categories: required skills, preferences, union rules, and geographical constraints that limit the number of providers that can potentially service an order on a particular day. Further, geographic constraints of consecutive service requests can impose undue burden in meeting the promised time windows and a less than optimal schedule is produced. Meeting time windows and optimizing travel time can be two conflicting objectives. One must consider the geographical distribution of expected service requests when allocating time windows to individual customers.

The present invention provides optimal time window allocation while considering two key variables: (1) a statistical estimate of the expected service requests, and (2) a statistical geographic distribution of these expected service requests. Incoming service requests are merged with both estimated and existing service orders. A computer program or software engine can be used to process these variables to generate an optimal scheduling solution. This optimal schedule may resolve or minimize conflicts with scheduling windows and transit times between service visits, minimizing transit times of service technicians.

Figure 1:
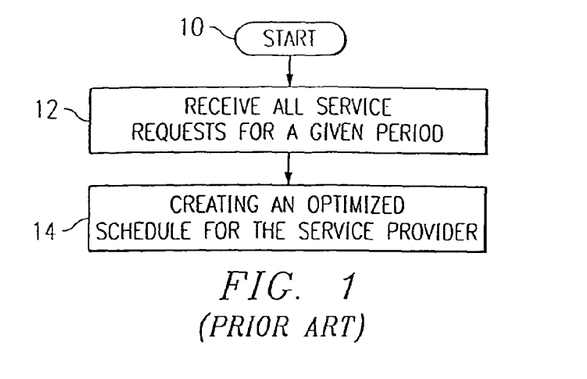
FIG. 1 shows a simplified flow chart illustrating one solution to optimally schedule multiple tasks.

In FIG. 1, a service provider would be able to optimize transit times for service technicians if the service provider did not promise time windows to customers until after all service requests for a particular daily schedule were gathered in step 12 and the unrestricted problem was solved first in step 14. However, the concept of operations for the service provider is to promise time windows at the time of every customer service request. Afterward, the service provider is obligated to honor the agreed upon time window. However, it is useful as claimed by the present invention to solve a less restrictive problem first and assign the customer a window that matches the output from this solution.

Since customers will not call in all at once, but rather staggered before the day of the schedule, it is possible for the order in which customers are inserted into the daily schedule to degrade the optimal solution generated by the method discussed above. Consider for example a customer who is the first to call in for a particular day. Suppose further that this customer is located a long way (say an hour's drive) from a depot or service technician's base of operations. As no other service requests are present in the daily schedule, the service provider would be able to send a service technician to the customer site at any time after the amount of time it takes for a service technician to drive to the customer's location. Therefore, if a provider starts at 8:00 AM, then the time window can be any time from 9:00 AM on throughout the day. However, if a time window of 9:00 AM is given, then at least one of the provider routes can become sub-optimal when other customers start calling in that happen to be between the first customer's location and that service technician's home location. A better solution would be for the time window allocated to the first customer to be later in the daily schedule allowing the service technician's route to be further optimized. The order in which the service requests are inserted into the daily schedule can reflect negatively on the optimality of the produced schedule. A maximization of a function:

$$P(\text{Time Window}|E(\text{Service Orders for the day})),$$

or the probability of the allocated time window given the estimated number of service orders for the day, is needed.

Figure 2:
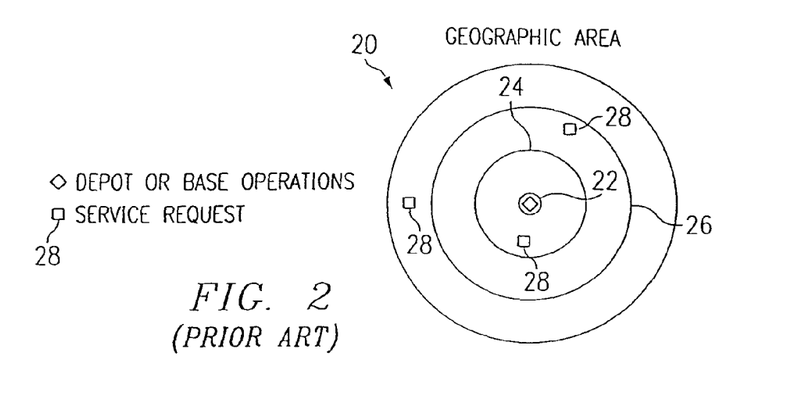
FIG. 2 illustrates a second solution of the prior art to the scheduling problem addressed by the present invention.

One solution presented in FIG. 2 involves assigning bands of concentric circles around a central depot that define time windows. A service provider may consider bands 20 of 8-10 AM 22, 9-11 AM 24, 10-12 PM 26 and so on; if a customer calls in and their location 28 is calculated to be in one of the bands, then that time window is applied. This approach is based on the following assumptions: (1) providers leave from, and return to, a central depot, and (2) service technicians are assumed to all be capable of the same skills. This approach is a simplified heuristic with regard to the general scheduling problem. There may be key aspects of the scheduling problem (such as skills and other constraints) that can be overlooked. There are difficulties in arbitrarily choosing the time window bands and their geographic boundaries.

Figure 3:
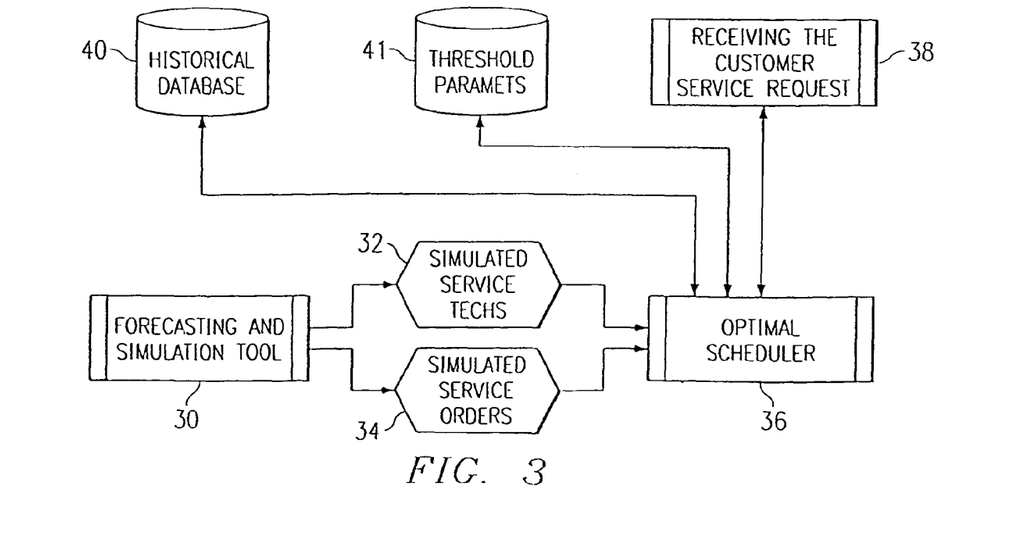
FIG. 3 provides a block diagram of one embodiment of the method of the present invention.

The method of the present invention provides a more favorable approach of considering a statistical estimate (or forecast) of the daily scheduling. In FIG. 3 a flow chart is provided outlining the method of the present invention. A simulation of the number and geographical distribution of the service orders (by service order type) is performed before any time windows for actual customers are allocated by a forecasting and simulation tool 30. An optimal schedule is generated by a scheduler 36. This statistically estimated schedule is based on providers 32 and simulated service orders 34 based on historical data 40. This simulated problem optimizes the estimated provider 32 drive times. Time windows are not considered for the simulated points 34. Each time a real customer service request 38 is allocated for a particular day's schedule, the real service request 38 data (including an allocated time window) replaces the closest simulated point 34. This process continues until a daily schedule is deemed to be full.

Figure 4:
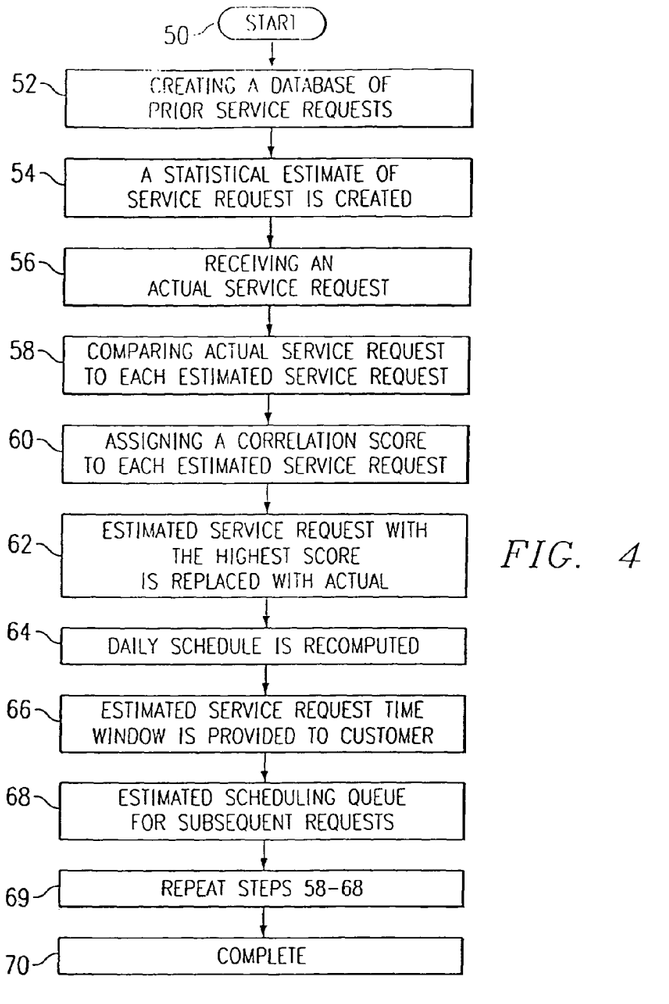
FIG. 4 is a detailed flow chart of the method of the present invention.

Referring to FIG. 4, a solution to this problem using an optimal scheduling software engine to allocate a time window for a new customer is provided. The method of the present invention will provide a method for allocating appointment time windows beginning with step 50. At step 52 a database of prior service requests is created.

In step 54 the data base is used to create a statistical estimate of a daily schedule. This estimate of the daily schedule comprises a series of estimated service orders 34 (see FIG. 3). The accuracy of the estimated daily schedule depends upon the validity of the data within the historical database 40 (see FIG. 3).

At step 56 of the present invention, the service provider receives an actual service order at a service center, call center or similar facility. The service provider responds to this actual service order by providing to the entity placing the service order a set of days and time windows in which the service provider can optimally fulfill the service order. The entity placing the service order then has the option of selecting from the various days and time windows available the day and time window that works best for the entity. This selection process then makes it possible for the service provider to impose a time window on the actual service order.

Once the imposed time window exists, the scheduling engine compares the actual service order and imposed time window to the predetermined set of statistically estimated service orders 34 and their time windows (see FIG. 3) in step 58. In step 60, the comparison between the actual service order and the statistically derived service orders occurs with reference to the variables relating to both types of service orders. At step 62, the estimated service order 34 (see FIG. 3) most similar to the actual service order in the imposed time window is replaced with the actual service order 38 (see FIG. 3), hence creating a new set of service orders.

At step 64 of the method of the present invention, the daily schedule is recomputed based on the new set of service orders (now including the actual service order), yielding a revised daily schedule. The result is an estimated time window that both the entity requesting the service and the service provider commit to in providing the least costly, most mutually satisfactory service.

The scheduling queue is examined in step 68 to determine if any subsequent service orders have been received. If any subsequent service orders have been received, steps 58-68 are repeated to determine a newly revised daily schedule while maintaining the prior customer commitments. At step 70 the process is complete until another subsequent service request is received.

The software will maintain a schedule of the existing customers (those that already have promised time windows and other restrictions), and will optimally insert a new customer (with a state of having no time window) in order to calculate an appropriate time window with regard to the existing schedule. This approach allows the time windows to be calculated based on a quasi-optimal transit time for service technicians while considering the geographical distribution and time windows that have been already promised to other customers. Narrower time windows become possible because the service provider has confidence that it will be able to produce an acceptable schedule that will honor prior commitments. Since the service provider has increased confidence that it can honor time windows, customer service will be improved.

The scheduling method will consider all service requests supplied to a service provider for a specified period of time (i.e., 1 day, 3 days, 1 week and the like). A series of variables attached to both the workforce and the service request is examined in order to determine the revised schedules. These variables include; (1) provider skills and preferences, (2) union rules, and (3) other like scheduling restrictions. The scheduler or computer program allows the data to drive the solution and the scheduler itself calculates the allocated time windows and schedules.

The exact determination that a daily schedule is full is service provider dependent. Some service providers want to avoid overtime, excessive number of service orders per provider, or may not have an adjunct contract staff available to take on extra work for the day.

The exact methods for simulating the daily scheduling problem and for optimizing the schedule are known to those skilled in the art of statistical analysis and forecasting. The forecasting problem can be solved via a simple parameter model or a complicated back-propagated neural network. Scheduling optimization allows, in general, a large number of different ways of approximating a solution.

Input parameters often examined in these methods may include but should not be limited to: (1) service provider defined time window width, (2) historical data to support the forecasting model and problem simulation, (3) actual or simulated provider profiles and availability, and (4) service provider threshold parameters that are used to indicate a full day or schedule.

Before the first service request is inserted into a daily schedule so that an optimal time window can be allocated, a simulation of the scheduling problem is performed and an estimated optimal schedule for this problem is determined. The simulation is based on a forecast of the following quantities or threshold parameters 41: (1) the geographic distribution of the service technicians, (2) the availability of the service technicians, (3) the skill sets, preferences, and other like restrictions of the service technicians (such as union rules), (4) the geographic distribution of the service requests, and (5) service request type, preference, and other like restrictions. When the service request information is gathered and sent to the scheduler 36, the service request is optimally inserted into the schedule. A time window surrounding its place of insertion is presented to the customer for their approval.

This process can be repeated for any specified time period. Most service providers will use the three days following the day that a customer makes a service request. Service providers may present the optimal time windows for each of the three days to the customer, allowing the customer to choose which time and day they prefer. In an embodiment of the present invention wherein the scheduler is a computer program, the process will take no more than several seconds, allowing the process to be performed while the customer waits. When the call is ended, the real customer data replaces the closest simulated data point on the day of their choosing. This process is repeated until the day is full. Finally, real data for each day are fed back into the forecasting model (historical database 40) to improve future appointment allocation.

The table below identifies the differences between the past methodology and the method of the present invention.

| Random Time Window Allocation | Intelligent Time Window Allocation |
|---|---|
| Wide Time Windows | Smaller Time Windows Possible |
| Based Only on Customer Input | Based on Optimal Scheduling |
| No Visibility into Worker Constraints: Skills, optimal Scheduling, Time Window Promised to Other Customers, Geographic Distribution, Union Rules | Complete Visibility into Promised Work Constraints: Skills, optimal Scheduling, Promised Time Windows, Geographic Distribution, other like scheduling constraints |
| Service Provider Ability to Meet Time Windows Not Assured | Better ability for Agency to Meet Time Windows |
| No attempt to Maximize Number of Jobs per Day | Increased Number of Jobs per Day |

The method of the present invention allows a service provider to determine in real-time time windows in which a service technician may fill a service request. Additionally, the present invention allows a service provider to alter and distribute new schedules to the workforce to meet emergent requirements while still maintaining prior customer commitments.

The method of the present invention allows a planner or scheduler to quickly alter and distribute new schedules to individual members of the workforce when unforeseen circumstances such as emergent work requests arise, forcing a change in the workforce schedule. This ensures that, despite the changing schedule, the workforce is used efficiently and effectively to respond to such changes.

Figure 5:
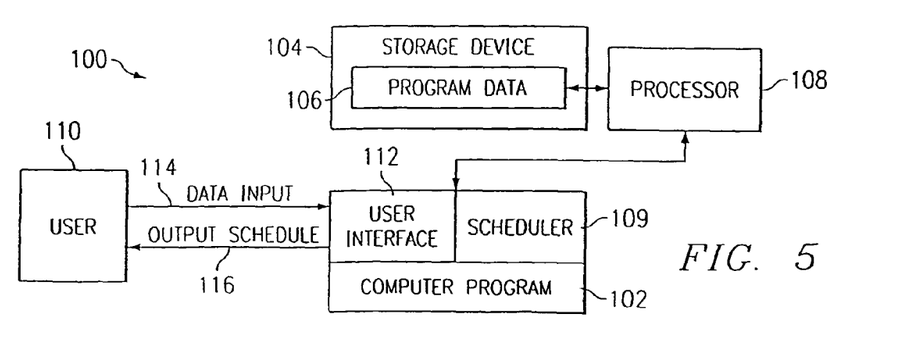
FIG. 5 provides a diagram of a computer system to implement the method of the present invention.

In an additional embodiment of the present invention, the method of the present invention may be effected by a computer system 100 as shown in FIG. 5 directed by a computer program 102 operable to schedule diverse work assignments and provide narrow time window for their performance. The computer system 100 will include a storage device 104 containing memory operable to store program data 106 and the computer program 102 itself. The storage device will be coupled to a processor 108. The processor will execute the computer program 102 such that the computer system 100 is directed by the computer program 102 to schedule the diverse work assignments for a mobile workforce and provide both narrow and accurate time windows to a user 110.

The computer program 102 will execute the method of the present invention as follows. A user 110 at a service center, call center or like facility will input a first service request 114 as provided by step 56 of FIG. 4 via a user interface 112. Based on a tag or other identifier assigned to the service request 114, the computer program 102 will identify the nature or type of the work assignment 114 as illustrated by step 58 of FIG. 4.

A data base 40, which may be contained in program data 106 is used to determine a statistical estimate of a daily schedule. This estimate of the daily schedule comprises a series of estimated service orders. The accuracy of the estimated daily schedule depends upon the validity of the data within the historical database.

This first actual service order is inserted into the daily schedule by utilizing the scheduling software to determine the least cost to employ the resources available. At this point, the first actual service order does not have a system imposed time window. The scheduling software is used to determine a time window surrounding this insertion point. If the customer accepts this window, then the closest estimated service order is replaced by this actual service order, and the daily schedule is recomputed based upon the revised set of service orders to yield a revised daily schedule 116. This process may be repeated for any number of days from which the customer may choose the time window that best meets the customer's availability.

The daily schedule is recomputed by scheduler 108 based on the new series of service orders yielding a revised daily schedule 116. An estimated time window for the service technician can then be provided to the customer.

The input data 114 is examined to determine if any subsequent service orders have been received. If any subsequent service orders have been received, the process is repeated to determine a newly revised daily schedule while maintaining the prior commitments.

The software will maintain a schedule of the existing customers (that already have promised time windows and other restrictions), and it will optimally insert a new customer (with a state of having no time window) in order to calculate an appropriate time window with regard to the existing schedule. This approach allows the time windows to be calculated based on a quasi-optimal transit time for service technicians while considering the geographical distribution and time windows that have been already promised to other customers. Narrower time windows become possible because the service provider has confidence that it will be able to produce an acceptable schedule that will honor prior commitments. Since the service provider has increased confidence that it can honor time windows, customer service will be improved.

The scheduling method will consider all service requests supplied to a service provider for a specified period of time (i.e., 1 day, 3 days, 1 week and the like). A series of variables attached to both the workforce and the service request is examined in order to determine the revised schedules. These variables include: (1) provider skills and preferences, (2) union rules, (3) and other like scheduling restrictions. The scheduler or computer program allows the data to drive the solution and the scheduler itself calculates the allocated time windows and schedules.

The present invention will maximize the number of service requests that can be performed in a day by the service provider. This will not prematurely cut off new jobs because of an uncertainty that it can meet previously promised work. The service provider will be able to determine when a day (or a part of the day) is full, allowing a determination of the service provider's ability to accept new service requests for that day. Further, the service provider will be able to control and efficiently utilize slack time in each service technician's schedule so that non-service order work can be inserted later, increasing the overall efficiency and utilization of the workforce.

Based on the contents of the service queue, an initial estimated schedule for each workforce member can then be created by the computer program 102.

After an estimated schedule has been created for the workforce, these schedules are examined by the computer program 102 to determine whether or not there are any periods of availability or slack time within the individual workforce member's schedule.

The method of the present invention provides advanced planning and scheduling software solutions enabling a user or planner to optimize the allocation of his workforce in response to the changing service requests and priorities present in the service industry. This allows the user to provide improved customer service and satisfaction, and improved workforce efficiency. This is accomplished by allowing the user to effectively communicate revised customer needs to the workforce and the expected workforce response to the customer. The present invention allows the user to increase their customer-responsiveness, fostering a reliable and timely service request commitment process, and allowing for better and more accessible information.

Furthermore, the present invention provides a software solution which allows a user to accommodate and effectively utilize skill levels of individuals within a workforce and assign service requests according to required skills. Often an intricate relationship exists between task definition, job requirements, shift scheduling, and employees' personal schedules and other preferences, further complicating the planning of work schedules.

The present invention allows the user to quickly and efficiently create schedules that meet employee preferences and still provide customer coverage with narrow time windows. Furthermore the present invention reduces the man hours spent trying to create a workable schedule by using the computational power of a computer. A user can quickly generate an efficient and accurate schedule in real time to provide customers with narrow time windows for service visits.

The present invention allows the service provider to determine service personnel requirements. This is accomplished by examining both past allocations of resources and expected future needs enabling the user to achieve a fair distribution or cost effective distribution of personnel.

The completion of work orders is efficiently tracked and prioritized determining which orders are inserted before others. Service providers can specify skills and work preferences that are taken into account when allocating service requests to the schedules. To improve customer service, appointment time windows are considered in the correlation model so as not to allow inserted work to cause unnecessary late or overtime.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A non-transitory computer-readable medium comprising a computer program, which when executed by a processor, performs a method for allocating appointment time windows to produce an optimal service schedule for a service provider that provides time window suggestions for a set of service orders, the medium comprising instructions for:

generating a statistical service schedule estimate for a predetermined service time period, said statistical service schedule estimate comprising a set of statistically-derived service orders considering both (1) a statistical estimate of expected service requests and (2) a statistical geographic distribution of said expected service requests;

(a) receiving an actual service order to fulfill in said predetermined service time period;

(b) responding to the actual service order by providing to the entity placing the service order a set of days and time windows in which the service order can be fulfilled;

(c) receiving a selection from the entity placing the service order on a desired set of days and time window that works best for the entity;

(d) imposing a time window on the actual service order;

(e) provisionally inserting the actual service order into the statistical service schedule estimate at a determined insertion time to determine an optimal time of arrival and to create a revised service schedule that includes the actual service order;

(f) testing said revised service schedule against input full-day indicators to determine that the actual service order can be inserted into the statistical service schedule estimate, and if the actual service order can be inserted into the statistical service schedule estimate based on the input full-day indicators then:

(g) calculating a time window that surrounds the determined insertion time in said revised service schedule using input parameters;

(h) locating a closest statistically-derived service order to the actual service order, if any, in said revised service schedule;

(i) if the closest statistically-derived service order is found in (h) (c), then removing the closest statistically-derived service order from said revised service schedule and inserting the actual service order together with the calculated time window into the service schedule in place of the removed closest statistically-derived service order, wherein said scheduled time of said actual service order is centered within said time window;

(j) re-optimizing the revised service schedule to make room for more actual service orders to be inserted;

(k) storing the revised service schedule in a memory; and (l) repeating (a)-(k) in response to the receipt of additional actual service orders.

2. A non-transitory computer-readable medium comprising a computer program, which when executed by a processor, performs a method for allocating appointment time windows to produce an optimal service schedule for a service provider that provides time window suggestions for a set of service orders, the medium comprising instructions for:

generating a statistical service schedule estimate for a predetermined service time period said statistical service schedule estimate comprising a set of statistically-derived service orders considering both (1) a statistical estimate of expected service requests and (2) a statistical geographic distribution of said expected service requests, wherein the generating includes a processor and a memory statistically-deriving the statistically-derived service orders;

(a) receiving an actual service order to fulfill in said predetermined service time period;

(b) responding to the actual service order by providing to the entity placing the service order a set of days and time windows in which the service order can be fulfilled;

(c) receiving a selection from the entity placing the service order on a desired set of days and time window that works best for the entity;

(d) imposing a time window on the actual service order;

(e) provisionally inserting the actual service order into the statistical service schedule estimate at a determined insertion time to determine an optimal time of arrival and to create a revised service schedule that includes the actual service order;

(f) testing said revised service schedule against input full-day indicators to determine that the actual service order can be inserted into the statistical service schedule estimate, and if the actual service order can be inserted into the statistical service schedule estimate based on the input full-day indicators then:

(g) calculating a time window that surrounds the determined insertion time in said revised service schedule using input parameters;

(h) locating a closest statistically-derived service order to the actual service order, if any, in said revised service schedule;

(i) if the closest statistically-derived service order is found in (h), then removing the closest statistically-derived service order from said revised service schedule and inserting the actual service order together with the calculated time window into the service schedule in place of the removed closest statistically-derived service order;

(j) re-optimizing the revised service schedule to make room for more actual service orders to be inserted;

(k) storing the revised service schedule in the a memory; and (l) repeating (a)-k) in response to the receipt of additional actual service orders.

3. The medium of claim 2, wherein the statistical service schedule estimate comprises a plurality of individual workforce member schedules.

4. The medium of claim 2, wherein the step of creating a statistical service schedule estimate further comprises the steps of: creating a database comprising estimated service orders; updating the database with the first and subsequent actual service orders; and refining the statistical estimate based upon the updated database.

5. The medium of claim 2, wherein the step of calculating said time window further comprises determining a plurality of potential estimated time windows and receiving a customer choice of a specific time window from the plurality of potential estimated time windows and wherein the chosen specific time window becomes fixed in the revised service schedule.

6. The medium of claim 5, wherein the revised service schedule for a workforce can be recomputed while maintaining the chosen specific time windows as a fixed constraint in the revised service schedule, and wherein the revised service schedule can be optimized with respect to several variables comprising: a first skill level required to complete the service order; a second skill level denoting an ability level of the individual workforce members; and a geographic location denoting where the service order is to be performed; and a travel time and distance between the geographic location denoting where the service is to be performed.

7. The medium of claim 5 wherein the choosing of a specific time window by the customer is influenced by additional price information related to each time window option.

8. The medium of claim 5 wherein the individual workforce member can select from a plurality of potential estimated time windows for specific non-work tasks and wherein the individual workforce member chooses a specific time window from the plurality of potential estimated time windows and wherein the chosen specific time window becomes fixed in the revised service schedule.

9. The medium of claim 5 wherein an individual workforce member can objectively review a potential new task, generated by the worker or an external system or individual, in the context of the existing daily schedule, so that the individual worker can determine whether or not to include the potential new task in their current revised service schedule.

10. The medium of claim 2 wherein the service time period over which a group of service orders are allocated or distributed can be minutes, hours, days, weeks, months, years or any combination thereof, and the fulfillment time windows on said actual service orders can be hours, days, weeks, months, years or any combination thereof.

11. The medium of claim 2 wherein the service schedule for each individual workforce member can include non-work tasks, generated or selected by the individual workforce member that are allocated together with the service orders.

12. The medium of claim 2 where future personnel requirements and optimized work territories are determined by filling days to pre-defined capacity levels.

13. The medium of claim 2, wherein the closest statistically-derived service order is found in (e), the medium further comprising instructions for:
   (m) displaying the time window for customer approval;
   (n) receiving a customer approval or rejection of the time window;
   (o) if a customer rejection is received, determining a next most closely related statistically-derived service order wherein said next most closely related statistically-derived service order is treated as said most closely related statistically-derived service order;
   (p) repeating (i) above; and
   (q) repeating (m) through (p) until customer approval of the time window is received.

14. The medium of claim 2 wherein the predetermined service time period is a multi-day period.

15. A non-transitory computer-readable medium comprising a computer program, which when executed by a processor, performs a method for allocating appointment time windows to produce an optimal service schedule for a service provider that provides time window suggestions for a set of service orders, the medium comprising instructions for:
   generating a statistical service schedule estimate for a predetermined service time period said statistical service schedule estimate comprising a set of statistically-derived service orders considering both (1) a statistical estimate of expected service requests and (2) a statistical geographic distribution of said expected service requests, wherein creating a statistical service schedule estimate further comprises:
   creating a database comprising estimated service orders;
   updating the database with one or more actual service orders; and
   refining the statistical estimate based upon the updated database;
   (a) receiving an actual service order to fulfill in said predetermined service time period;
   (b) responding to the actual service order by providing to the entity placing the service order a set of days and time windows in which the service order can be fulfilled;
   (c) receiving a selection from the entity placing the service order on a desired set of days and time window that works best for the entity;
   (d) imposing a time window on the actual service order;
   (e) provisionally inserting the actual service order into the statistical service schedule estimate at a determined insertion time to determine an optimal time of arrival and to create a revised service schedule that includes the actual service order;
   (f) testing said revised service schedule against input full-day indicators to determine that the actual service order can be inserted into the statistical service schedule estimate, and if the actual service order can be inserted into the statistical service schedule estimate based on the input full-day indicators then:
   (g) calculating a time window that surrounds the determined insertion time in said revised service schedule using input parameters;
   (h) locating a closest statistically-derived service order to the actual service order, if any, in said revised service schedule;
   (i) if the closest statistically-derived service order is found in (h), then removing, utilizing at least one processor and memory, the closest statistically-derived service order from said revised service schedule and inserting the actual service order together with the calculated time window into the service schedule in place of the removed closest statistically-derived service order;
   (j) re-optimizing the revised service schedule to make room for more actual service orders to be inserted;
   (k) storing the revised service schedule in a memory; and
   (l) repeating (a)-k) in response to the receipt of additional actual service orders.

* * * * *